(12) United States Patent
Lehtonen

(10) Patent No.: US 6,644,607 B2
(45) Date of Patent: Nov. 11, 2003

(54) ARRANGEMENT FOR FASTENING WIRELESS TERMINAL ACCESSORY

(75) Inventor: Jarmo Lehtonen, Littoinen (FI)

(73) Assignee: Nokia Corporation, Espoo (FI)

(*) Notice: Subject to any disclaimer, the term of this patent is extended or adjusted under 35 U.S.C. 154(b) by 0 days.

(21) Appl. No.: 10/014,174

(22) Filed: Dec. 11, 2001

(65) Prior Publication Data

US 2002/0104943 A1 Aug. 8, 2002

(30) Foreign Application Priority Data

Dec. 14, 2000 (FI) ............................................... 20002745

(51) Int. Cl.[7] ................................................ A47B 96/00
(52) U.S. Cl. .............................. 248/224.7; 248/220.22
(58) Field of Search ................................ 379/454, 426, 379/446, 455; 248/220.21, 220.22, 222.12, 223.41, 224.7, 229.17, 228.8, 230.8, 300; 224/197, 269

(56) References Cited

U.S. PATENT DOCUMENTS

| 2,638,643 | A | * | 5/1953 | Olson |
| 4,256,281 | A | * | 3/1981 | Harris et al. ................. 248/231 |
| 5,193,725 | A | * | 3/1993 | Radocy ....................... 224/194 |
| 5,583,935 | A | | 12/1996 | Dunchock .................... 379/454 |
| 5,813,649 | A | * | 9/1998 | Peterson et al. ............. 248/618 |
| 6,036,071 | A | * | 3/2000 | Hartmann et al. .......... 224/547 |
| 6,138,969 | A | * | 10/2000 | Olausson ................. 248/222.52 |

FOREIGN PATENT DOCUMENTS

| DE | 19538249 A1 | 6/1996 |
| DE | 19526602 A1 | 1/1997 |
| EP | 0904984 A1 | 3/1999 |
| EP | 0917989 A1 | 5/1999 |
| NO | 168570 B | 12/1991 |
| WO | WO 96/04153 | 2/1996 |
| WO | WO 98/35854 | 8/1998 |
| WO | WO 99/21734 | 5/1999 |

OTHER PUBLICATIONS

Patent Abstract of Japan No. JP 05305846.

* cited by examiner

*Primary Examiner*—Gwendolyn Baxter
(74) *Attorney, Agent, or Firm*—Perman & Green, LLP

(57) ABSTRACT

A fastening arrangement comprising an accessory (501) of a wireless communications device, an adapter part (503, 503') and a substantially plate shaped piece (502) including holes in order to allow this piece to be bent at a line (544, 545) formed of the holes. The substantially plate shaped piece is arranged to be fastened from a particular point into a groove (566, 1110) outside the arrangement. The fastening arrangement comprises a fastening (533,833) for connecting the adapter part and said accessory with one another. The adapter part (503, 503') is a case and comprises a recess (513) for receiving another part of the substantially plate shaped piece within the adapter part in order to fasten the adapter part and said accessory (501) to the substantially plate shaped piece.

11 Claims, 8 Drawing Sheets

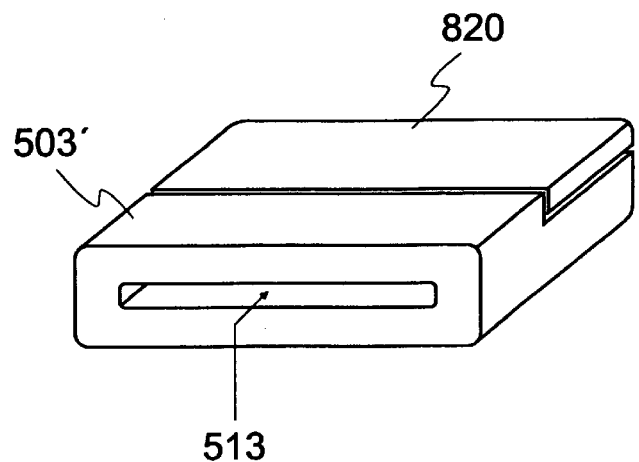
Fig. 10
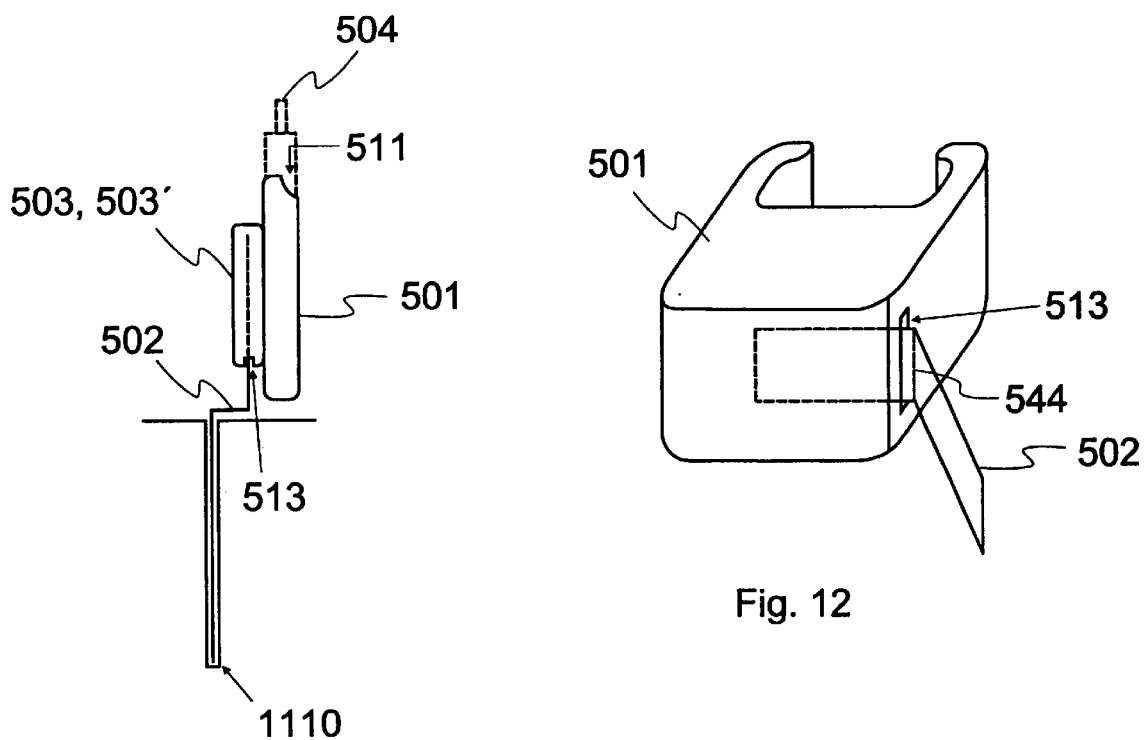
Fig. 11
Fig. 12

ARRANGEMENT FOR FASTENING WIRELESS TERMINAL ACCESSORY

FIELD OF THE INVENTION

The present invention relates to fastening an accessory of a wireless terminal. More particularly, but not necessarily, the invention relates to fastening a mobile phone car holder into a car.

BACKGROUND OF THE INVENTION

A car holder is typically a holder made of plastic, into which the mobile phone user may place his/her phone while being in the car. Conventionally a car holder is fastened with screws to the interior of a car. Such a holder leaves annoying screw holes in the interior of the car when it is removed.

Patent application WO 99/21734 offers a solution to this problem. FIG. 1 illustrates a preferred embodiment presented in publication WO 99/21734. In this solution a fastening arrangement 300 including a fastening portion 310 and a fastening element 320 of an accessory is fastened to the car without making any screw holes into the interior of the car. The fastening arrangement 300 is fastened to a side window 350 of a car using the fastening element 320 by pressing the gap of the fastening element 320 against the edge of the window glass 350 so that the glass 350 is pressed against the gap of the fastening element 320. The gap is achieved by bending the plate that forms the fastening element 320. In the situation shown in FIG. 1 the side window 350 of the car is raised against a sealing 370 of a car door frame 360, in other words the car window is closed. An antenna part 340 fastened to the fastening element 320 thus remains outside the car.

FIG. 2 illustrates how the fastening arrangement shown in FIG. 1 is assembled. The fastening element 320 is provided with screw threaded holes, to which the antenna part 340 and the fastening portion 310 of the accessory is fastened with screws 400 and 410. The fastening portion 310 of the accessory includes holes 380, to which a car phone holder can be fastened with a screw. In addition, the fastening portion 310 of the accessory is provided with a cut tongue 390. The tongue forms a gap, into which, for example, a shopping list or a map can be inserted.

A drawback with the fastening arrangement 300 shown in FIGS. 1 and 2 is that the side window 350 of the car cannot be properly opened when the fastening arrangement 300 is in position. The fastening arrangement 300 may also annoy the passengers, as the fastening portion 310 of the accessory stretches far inside the car.

FIG. 3 illustrates another embodiment presented in publication WO 99/21734. A fastening arrangement 300b comprises a fastening portion 310 and a fastening element 330 of the accessory. The accessory's fastening portion 310 is fastened to the fastening element 330 with a screw 400. The fastening element 330 is provided with an adhesive surface 450 in order to fasten the fastening arrangement 300b to the car. The accessory's fastening portion 310 comprises openings 380, into which the car holder can be fastened with a screw. In addition, the accessory's fastening portion 310 comprises a cut tongue 390. The tongue forms a gap, into which a shopping list or a map can be inserted.

FIG. 4 illustrates how to use the fastening arrangement 300b shown in FIG. 3. Said fastening arrangement 300b is glued onto an inner side 440 of a car door 430. The fastening element 330 to be adhered in the fastening arrangement is inserted into the gap between the side window 350 of the car and the car door 430. The adhesive surface 450 of the fastening element 330 sticks to the inner part 440 of the door 430. Consequently, both the side window glass 350 of the car and the adhering fastening element 330 of the fastening arrangement 300b remain between the car door sealings 460a and 460b. The surface leaning against the glass 350 of the fastening element 330 is made slidable by providing the surface with a teflon coating, for example, in which case the fastening arrangement 300b does not make it more complicating to open and close the side window 350 of the car, and does not scratch the glass. The entire fastening arrangement 300b can be made of metal sheet coated with a teflon coating.

A drawback with the second embodiment presented in publication WO 99/21734 is that the fastening portion 310 with its holes remains visible after the car phone holder is fastened and takes up a lot of space. In addition the screws, by which the car phone holder is attached to the fastening portion 310, remain disturbingly visible.

SUMMARY OF THE INVENTION

The present invention is a new invention that in relation to prior art solutions offers a more advanced arrangement to fasten an accessory of a wireless terminal.

According to a first aspect of the invention a fastening arrangement is implemented that comprises an accessory of a wireless communications device, an adapter part and a substantially plate-like piece, the substantially plate-like piece having holes in order to allow it to be bent at a line formed of the holes, and the substantially plate-like piece being arranged to be fastened from a first point into a groove outside the arrangement, the fastening arrangement comprising fastening means for connecting the adapter part and said accessory with one another. The fastening arrangement is characterized in that the adapter part is case-like and comprises a recess for receiving a second point of the substantially plate-like piece inside the adapter part in order to fasten the adapter part and said accessory to the substantially plate-like piece.

According to a second aspect of the invention a fastening apparatus is implemented for fastening an accessory of a wireless communications device to a fastening portion outside the fastening apparatus, the fastening apparatus comprising an adapter part and a substantially plate-like piece, the substantially plate-like piece having holes in order to allow said piece to be bent at a line formed of the holes, and the substantially plate-like piece being arranged to be fastened from a first point into a groove outside the arrangement, the fastening arrangement comprising fastening means for connecting the adapter part and said accessory with one another. The fastening apparatus is characterized in that the adapter part is case-like and comprises a recess for receiving a second point of the substantially plate-like piece inside the adapter part in order to fasten the adapter part and said accessory to the substantially plate-like piece.

According to a third aspect of the invention an adapter part is implemented for fastening an accessory of a wireless communications device, the adapter part comprising fastening means for fastening said accessory to the adapter part, the adapter part further being arranged to be connected with a particular substantially plate-like piece. The adapter part is characterized in that it is case-like and comprises a recess for receiving a substantially plate-like piece at least partly inside the adapter part in order to fasten the adapter part and said accessory to the substantially plate-like piece.

According to a fourth aspect of the invention a fastening arrangement is implemented comprising an accessory of a wireless communication device and a substantially plate-like piece, the substantially plate-like piece having holes in order to allow it to be bent at a line formed of the holes, and the substantially plate-like piece being arranged to be connected from a first point into a groove outside the arrangement. The fastening arrangement is characterized in that the accessory is case-like and comprises a recess for receiving a second point of the substantially plate-like piece within the accessory in order to fasten the accessory to the substantially plate-like piece.

Said wireless communication device is a device that is intended for wireless communication. The communication device is preferably a mobile station in a cellular network. However, lines can be connected to a wireless communication device, for example a line for feeding a charging current from a cigarette lighter in a vehicle. The wireless communication device may comprise separately a mouthpiece and an earpiece connected with a line. This is true for example in a conventional car phone. Although a wireless communication device comprises lines or wires, or lines or wires can be connected thereto, said lines or wires do not render the wireless communication device a wired device. What wireless refers to in the present invention is above all wireless communication.

Preferably said accessory of the wireless communication device is a mobile station holder arranged to receive a mobile station. In a preferred embodiment of the invention the wireless communication device comprises more than one part. Said device may comprise separately a mouthpiece and an earpiece. In this embodiment the accessory of the wireless communication device is a holder that receives said earpiece, such as a car phone earpiece. In a preferred embodiment of the invention the fastening means comprise only one screw. The screw remains substantially entirely inside the fastening arrangement, thus causing no aesthetic or other harm to the user. The substantially plate-like piece refers to a piece that is mainly flat and/or plate-like. Said piece comprises at least one flat plate-like portion. The substantially plate-like piece is preferably an aperture plate.

In a preferred embodiment of the invention the aperture plate is fastened with a screw to the recess of the adapter part which is case-like. In another preferred embodiment of the invention the aperture plate is locked, partly inside the adapter part, using quick release locking. The fastening arrangement is preferably fastened to an aperture plate from such a point that extends beyond the adapter part to a fastening point outside the fastening arrangement, without having to form holes/a screw fastening to the fastening point. An exterior fastening point is preferably a gap or a groove or the like, in which the aperture plate remains by means of frictional force. Preferably the fastening arrangement is fastened to a vehicle, such as a car or a boat.

BRIEF DESCRIPTION OF THE DRAWINGS

In the following the invention will be described in greater detail with reference to the accompanying drawings, in which FIG. 10 is a perspective view illustrating an adapter part in an alternative embodiment of the invention, FIG. 11 illustrates an example according to the invention of how to fasten the arrangement comprising a mobile phone holder, an adapter part and an aperture plate, FIG. 12 illustrates another embodiment of the invention.

DETAILED DESCRIPTION

Figure 1:
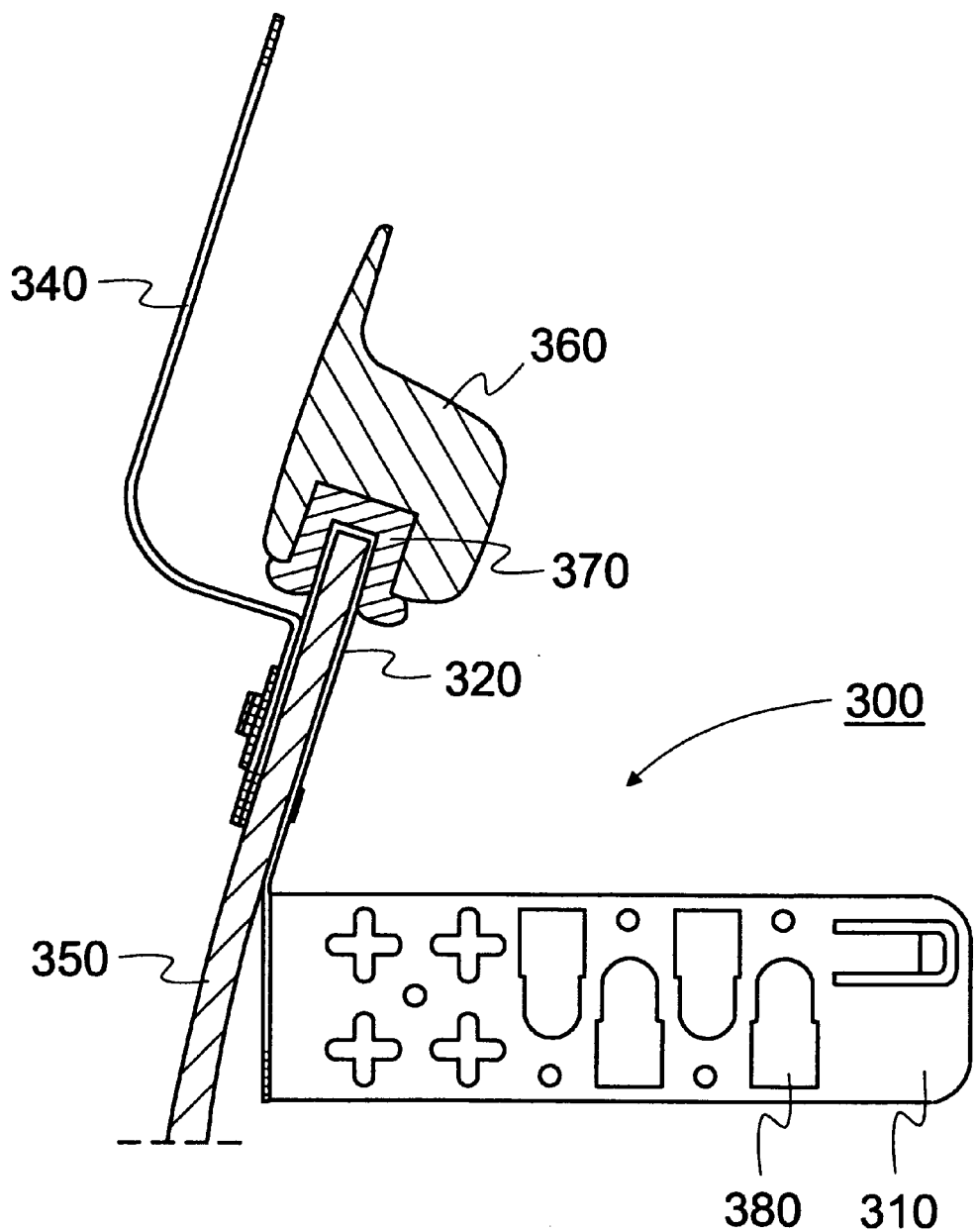
FIG. 1 illustrates a prior art fastening arrangement in use.
Figure 2:
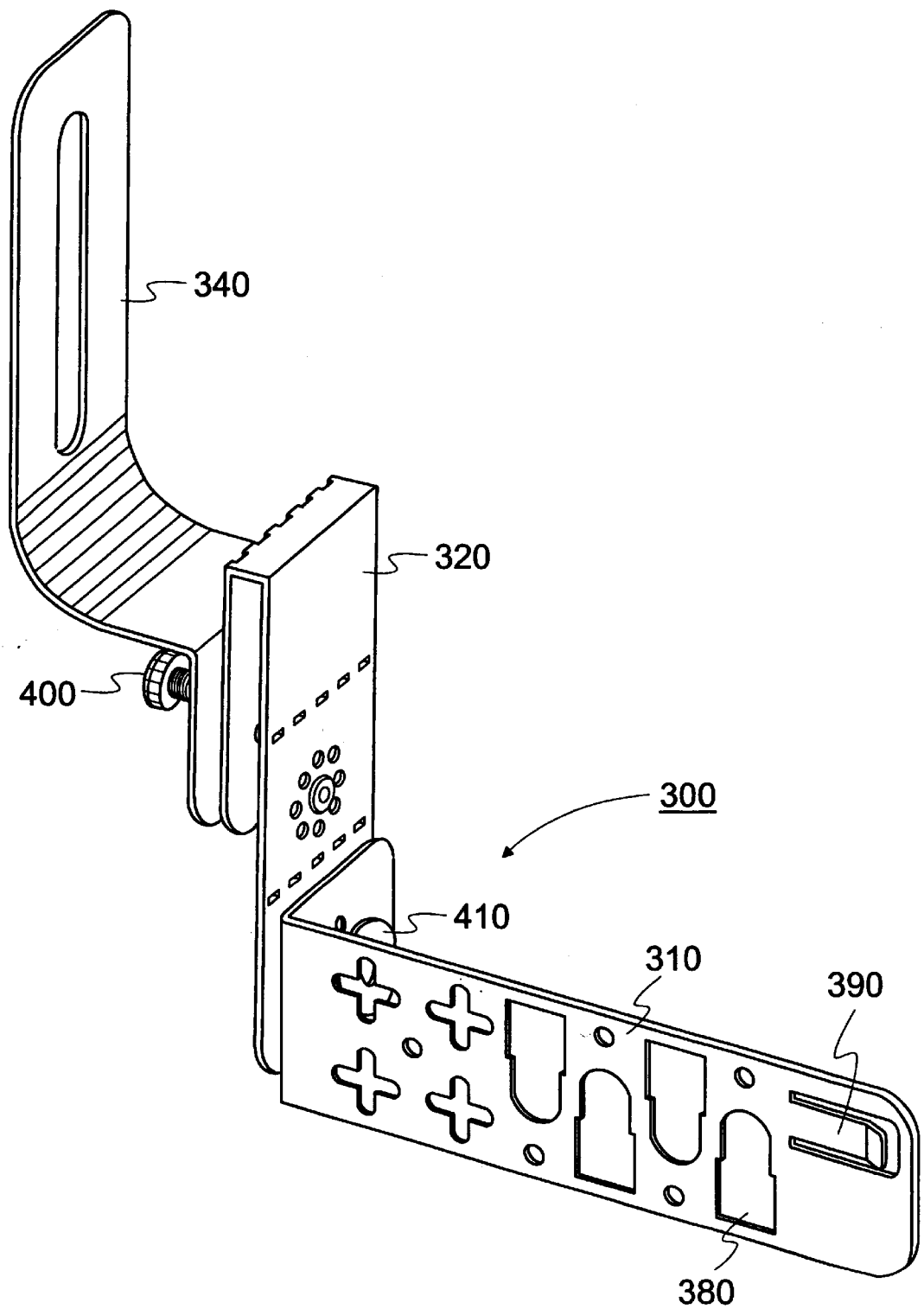
FIG. 2 shows how the fastening arrangement is assembled in FIG. 1.
Figure 3:
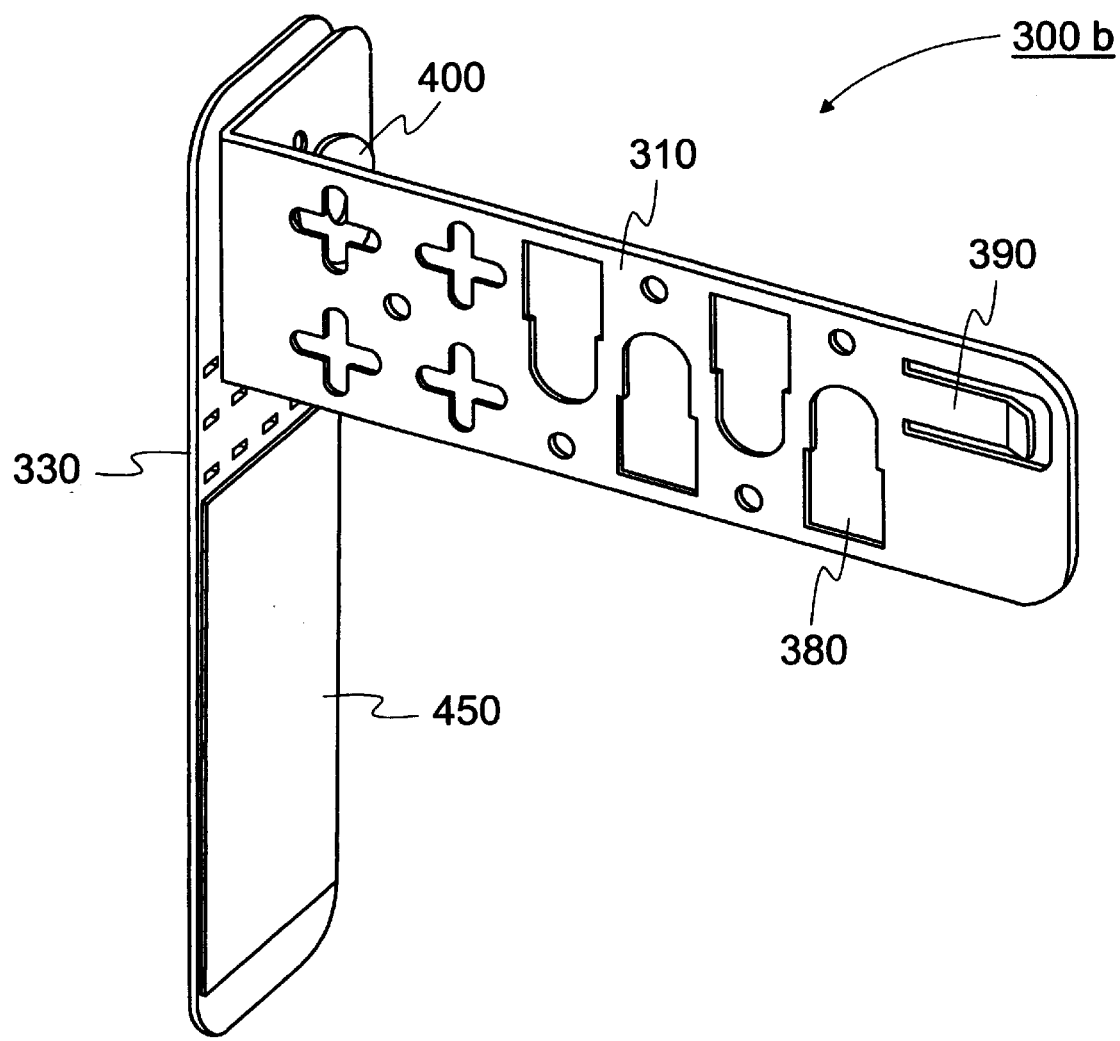
FIG. 3 shows another prior art fastening arrangement.
Figure 4:
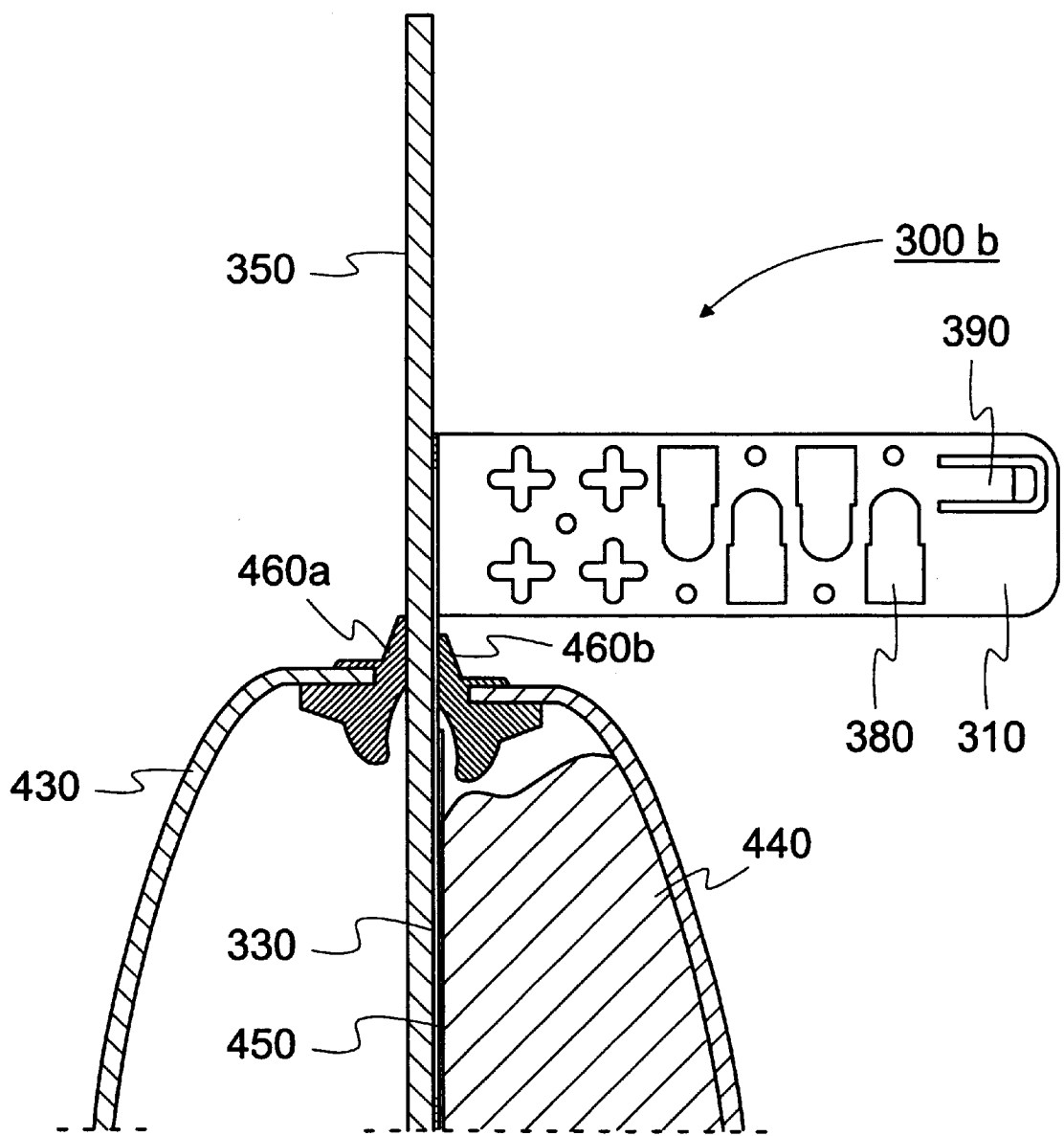
FIG. 4 shows the fastening arrangement of FIG. 3 in use.
Figure 5A:
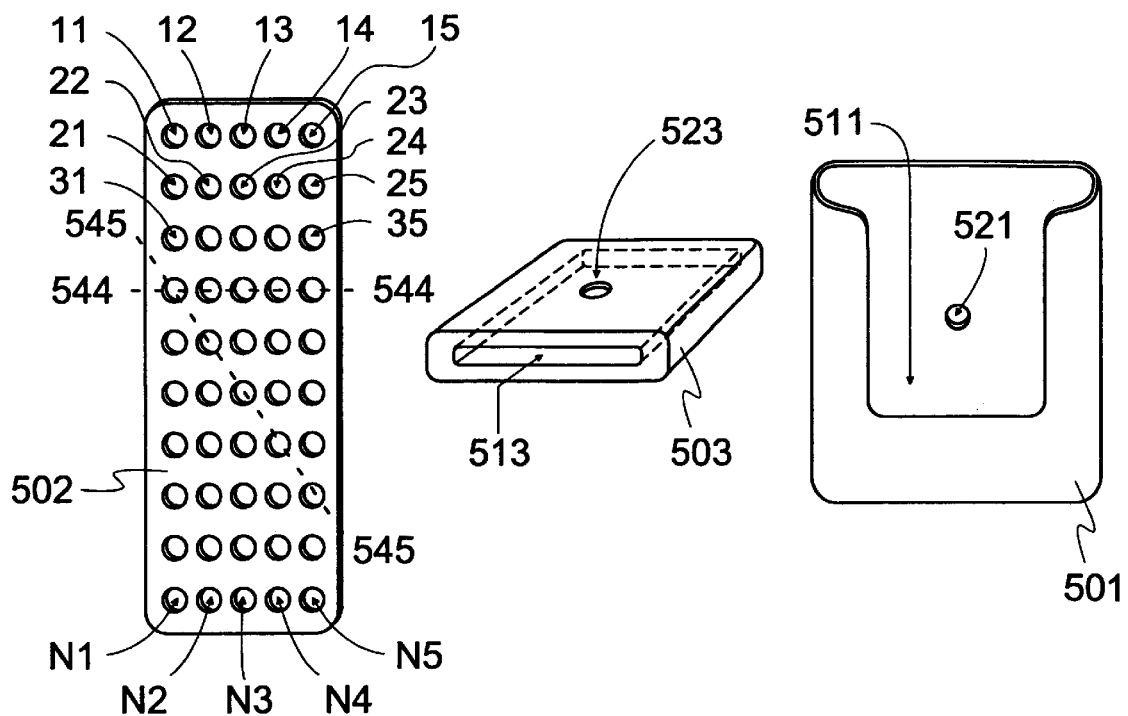
FIG. 5a illustrates the basic parts in a preferred embodiment of the invention.

A preferred embodiment of the invention provides a solution for fastening a mobile phone holder to a vehicle. FIG. 5a illustrates the basic parts including a mobile phone holder 501, an aperture plate 502 and an adapter part 503 to be used in a preferred embodiment of the invention. The mobile phone holder 501 forms a pocket 511, into which a mobile phone can detachably be placed. The aperture plate 502 comprises holes 11 to 15, . . . , N1 to N5 that form lines 544, 545 along which the aperture plate 502 can be folded into an appropriate shape. As the aperture plate 502 includes plenty of holes, said plate can be perpendicularly folded in relation to the longitudinal direction thereof (along line 544) and also diagonally folded along line 545.

The adapter part 503 comprises a recess 513 into which the aperture plate 502 can partly be inserted in order to fasten the adapter part 503 to the aperture plate 502. The mouth of the recess 513 preferably has the form of a rectangle. The adapter part 503 also comprises a hole 523. The mobile phone holder 501, which also comprises a hole 521 at the same place as the adapter part, can be fastened to the adapter part 503 and to the aperture plate 502 with a screw (not shown in FIG. 5a) through the holes 521 and 523.

Figure 5B:
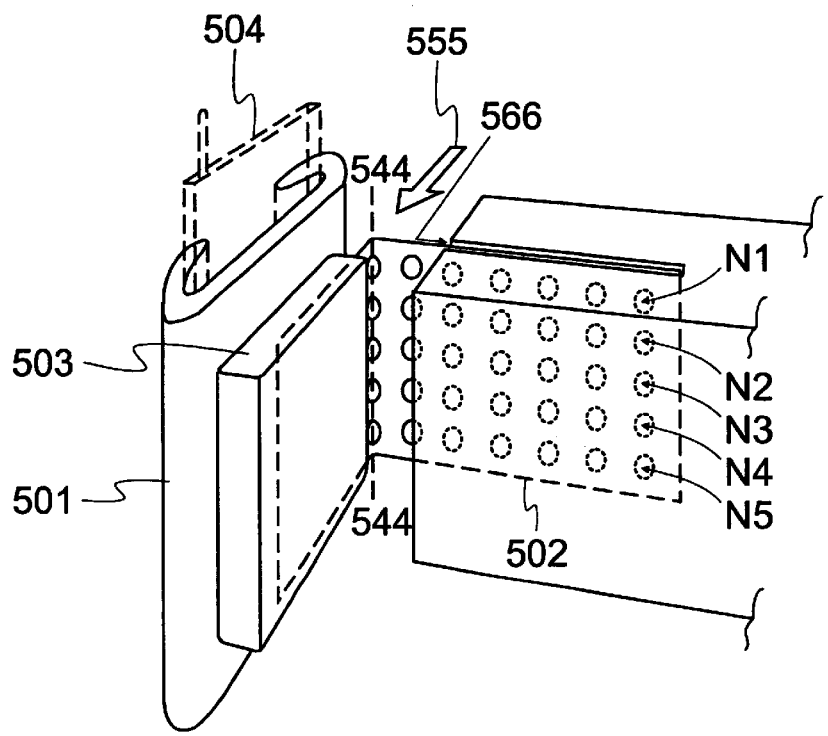
FIG. 5b illustrates how the basic parts shown in FIG. 5a are connected together in the inventive sense.

FIG. 5b illustrates how the basic parts shown in FIG. 5a are connected together in the inventive sense. The aperture plate 502 is inserted in the direction shown by the arrow 555 (perpendicularly against the mouth of the recess 513 in the adapter part) into the recess 513 inside the adapter part 503 so that a hole 23 in the aperture plate is placed against the hole 523 of the adapter part. Preferably the recess 513 in the adapter part is so deep that the hole 23 of the aperture plate is placed against the hole 523 of the adapter part, when the aperture plate 502 is pushed to the bottom of the recess 513. The mobile phone holder 501 is placed against the adapter part 503 into a correct position so that the hole 521 of the mobile phone holder is placed in register with the adapter part hole 523 and the aperture plate hole 23. In order to connect the parts with one another, a screw is pushed into the hole 521, 523, 23 from the side of the mobile phone holder 501, and then the screw is tightened using a screwdriver. The holes 521, 523, 23 and the screw remain invisible in FIG. 5b. As the mobile phone holder 501 is fastened from the middle with a single screw (through the hole 521), the mobile phone holder 501 can be turned into a desired position.

The arrangement composed of the mobile phone holder 501, the adapter part 503 and the aperture plate 502 is fastened to an element that is placed outside the arrangement from the aperture plate 502. The arrangement can be fastened, for example, to a space between two surfaces, into a groove 566, by inserting the free end of the aperture plate 502 (the end that is not inside the adapter part 502) into a groove 566. The groove 566 is preferably so narrow that the aperture plate 502 remains in position in the groove 566 by means of frictional force that the edges of the groove direct to the aperture plate 502 when pressing the surfaces of the aperture plate 502. Alternatively the arrangement can be connected onto an appropriate surface or between surfaces using a similar adhesive fastening as described in publication WO 99/21734 mentioned above. In FIG. 5b a broken line indicates the outlines of a mobile phone 504 to be placed into the pocket 511 of the mobile phone holder 501.

Figure 6:
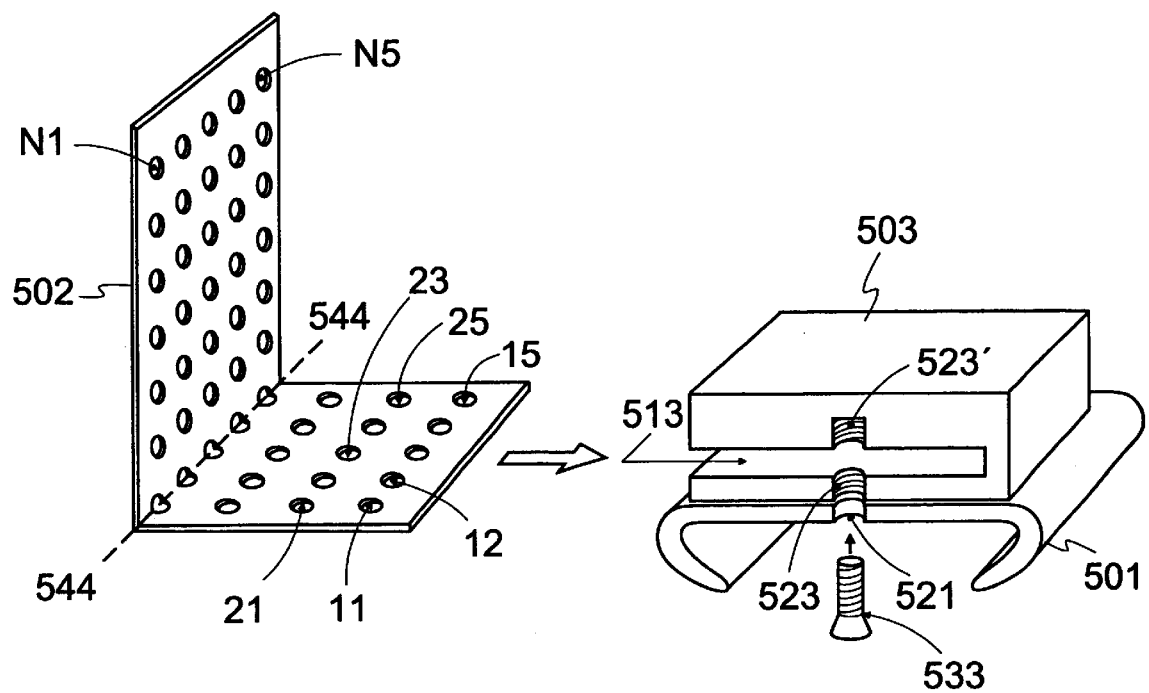
FIG. 6 is a combined perspective and sectional view illustrating a preferred embodiment of the invention.

FIG. 6 is a combined perspective and sectional view of a preferred embodiment of the invention. The Figure shows an aperture plate 502 that is bent by hand into a 90-degree angle at the fourth line 544 of holes calculated from one end of the aperture plate. The adapter part 503 and the mobile phone holder 501 are aligned so that the adapter part hole 523, 523' and the mobile phone holder hole 521 are placed against one another. FIG. 6 shows the adapter part 503 and the mobile phone holder 501 in crosscut, wherefore said parts are shown only partly in FIG. 6. The adapter part 503 and the mobile phone holder 501 are cut in the Figures at the holes 523, 523' and 521 at the vertical level that perpendicularly faces the level determined by the mouth of the recess 513 in the adapter part. In FIG. 6 the mouth of the recess 513 in the adapter part is shown on the left.

The hole 523, 523' of the adapter part extends from the outer surface of the adapter part 503 to the recess 513 and through the recess to a part in the adapter part placed on the other side of the recess 513. Preferably it does not penetrate the entire adapter part, but extends merely to a particular depth on the other side of the recess. Here, the part of the hole 523 extending from the outer surface of the adapter part to the recess in the middle of the adapter part is referred to as an initial part of the hole, and the part 523' extending from the recess to the other side of the recess as an end part of the hole. Both the initial part 523 and the end part 523' of the hole are threaded. Alternatively, only the end part 523' is threaded. After pushing the aperture plate 502 into position in the direction of the arrow (in the longitudinal direction of the aperture plate) partly inside the aperture part 503, thus placing the hole 23 in line with the adapter part and mobile phone holder holes 521, 523 and 523', the parts are connected together with a screw 533. The screw 533 that fits into the threads of the adapter part 503 is pushed into the holes 521 and 523 from the side of the mobile phone holder 501 and tightened using a screwdriver.

Figure 7:
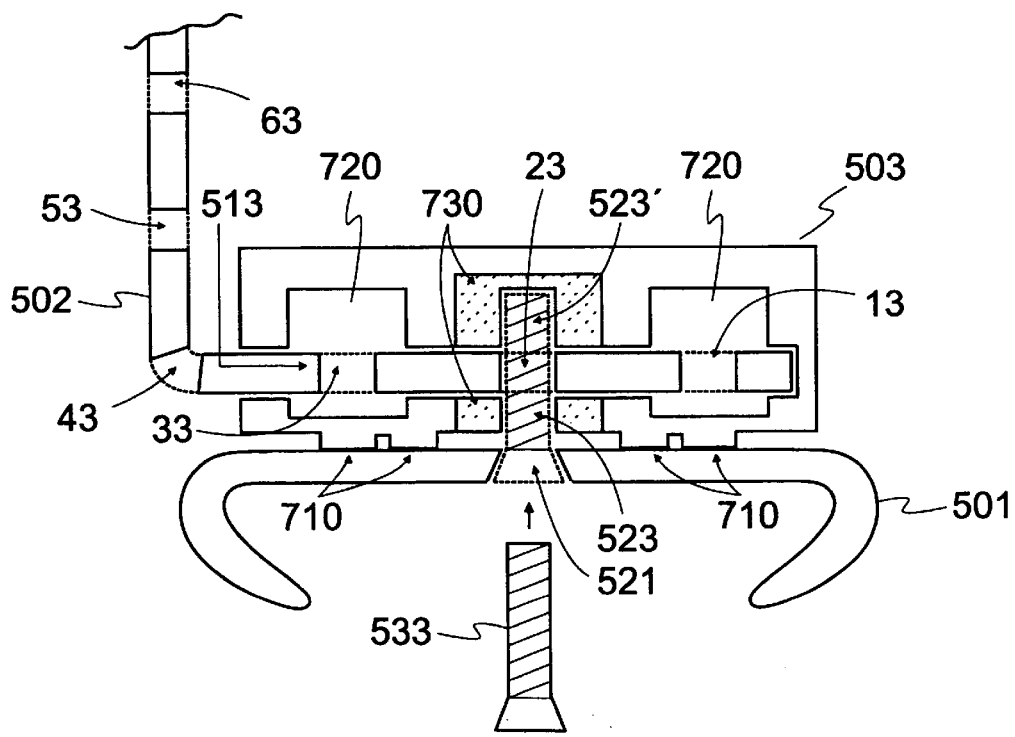
FIG. 7 is a sectional view illustrating a preferred embodiment of the invention.

FIG. 7 shows in crosscut a situation in which the aperture plate 502 is in position in the recess 513 of the adapter part. The crosscut in FIG. 7 is taken at the same level as on which the adapter part 503 and the mobile phone holder 501 are cut in FIG. 6. Thus, FIG. 7 corresponds to FIG. 6 in a situation, in which the aperture plate 502 is pushed into the recess 513 of the adapter part. In comparison with FIG. 6, FIG. 7 includes a few more details. The adapter part 503 comprises on its outer surface preferably a set of studs 710 placed in a circle that is suitable to be placed on the counterpart surface of the mobile phone holder 501 in such a manner that when the mobile phone part 501 is pressed against the adapter part 503 and the aperture plate 502 with a screw 533, the set of studs 710 locks the mobile phone holder into an appropriate position in relation to the adapter part. The set of studs placed in a circle allows to place the mobile phone holder 501 into various positions, and is known for example from the mobile phone holders that Nokia manufactures.

The adapter part 503 may include hollow parts 720 for making the adapter part lighter. The hollow parts 720 may be connected with the recess 513 of the adapter part. The hole 523, 523' of the adapter part is surrounded with an insert 730 made of metal and including a threaded hole. In fact the threaded hole 523, 523' of the insert 730 forms the hole of the adapter part mentioned above. The metal (and not, for example, plastic) in the insert allows the screw 533 to be properly fastened. The recess 513 of the adapter part divides the insert 730 into two parts, whereof the first one with its threaded holes forms the end part 523' of the adapter part hole and the second one with its threaded holes forms the initial part 523 of the adapter part hole. A dashed line illustrates the position of the screw 533 when said screw is put in place inside the adapter part 503. The screw 533 restricts the motion of the aperture plate 502 both in the longitudinal and lateral directions. The edges of the recess 513 restrict the motion of the aperture plate in the vertical direction. FIG. 7 also shows the holes 13, 23, 33, 43, 53 and 63 of the middle column in the aperture plate.

Figure 8:
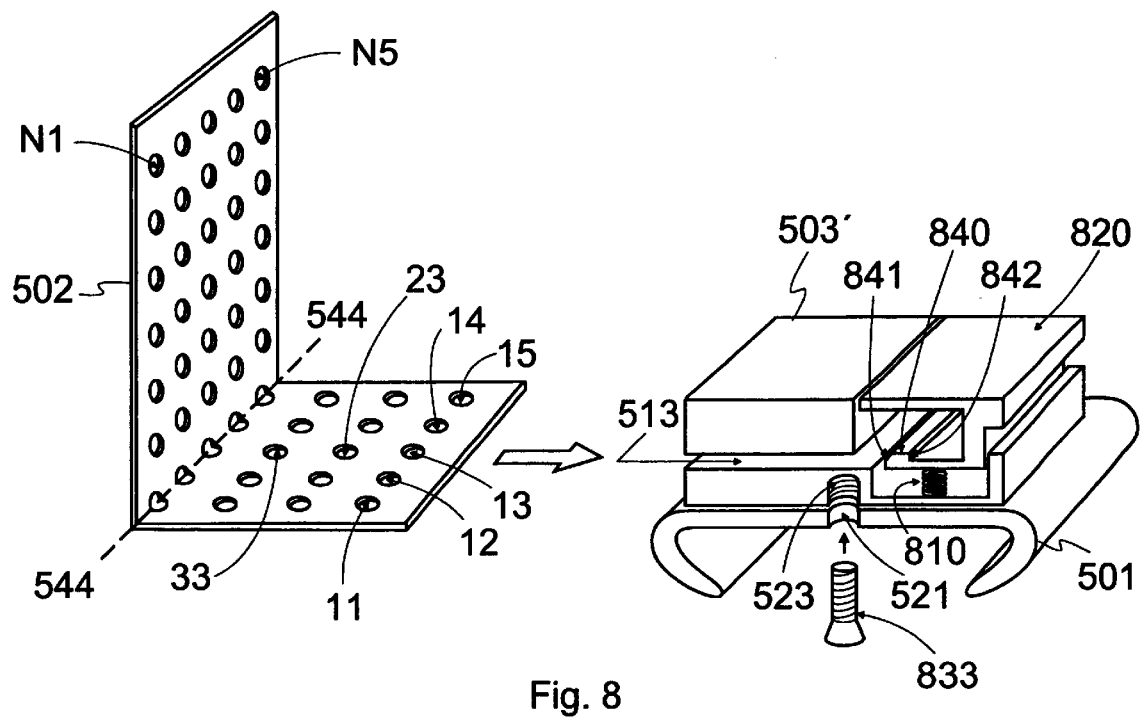
FIG. 8 is a combined perspective and sectional view illustrating an alternative embodiment of the invention.

FIG. 8 is a combined perspective and sectional view illustrating an alternative embodiment of the invention. The Figure shows an aperture plate 502 that is bent by hand, for example, at a 90-degree angle calculated from one end of the aperture plate at the fourth line of holes 544. The adapter part 503' and the mobile phone holder 501 are placed against each other in order to be fastened so that the hole 523 of the adapter part and the hole 521 of the mobile phone holder face one another. FIG. 8 shows the adapter part 503' and the mobile phone holder 501 in crosscut, wherefore they are only partly shown in FIG. 8. The adapter part and the mobile phone holder are cut in the Figures at the holes 523 and 521 at the vertical level that is perpendicularly against the level determined by the mouth of the recess 513 in the adapter part. In FIG. 8 the mouth of the recess 513 in the adapter is shown on the left.

The hole 523 of the adapter part extends in this alternative embodiment of the invention from the outer surface of the adapter part to a particular depth inside the adapter part 503'. Thus, it does not extend to the recess 513 and not through the recess to the adapter part on the other side of the recess. The hole 523 is threaded. The adapter part 503' and the mobile phone holder 501 are fastened together with a screw 833. The screw 833 that fits into the threads of the adapter part hole 523 is pushed into the holes 521 and 523 from the side of the mobile phone holder 501 and is tightened using a screwdriver. In an alternate embodiment of the invention the aperture plate 502 is not fastened to the adapter part 503' and the mobile phone holder 501 with a screw 833, instead quick release locking is used. In order to use quick release locking the adapter part 503' comprises a separate locking part 820 that is fastened to he rest of the adapter part with a spring 810. In a basic state the spring 810 is substantially strainless, in which case a locking element 840, which is a particular part in the locking part 820, is placed on an extension of the adapter part recess 513. The locking element 840 comprises a bevel 841 that presses the locking element 840 (and the entire locking part 820) downwards (towards the edge of the adapter part 503', on the side of the mobile phone holder 501), when the aperture plate 502 is inserted into the recess 513. Then the spring 810 of the adapter part is strained and the aperture plate 502 slides over the locking element 840. When the hole 13 of the aperture plate reaches the locking element 840, said locking element shaped to fit the hole 13 moves towards the hole 13 by means of the spring force of the spring 810, and locks the aperture plate 502 inside the adapter part 503'. The spring 810 of the adapter part is reset to a substantially strainless state. A threshold 842 of the locking element placed on the opposite side of the locking element 840 than the bevel 841 prevents the aperture plate from moving away from the recess 513.

Figure 9:
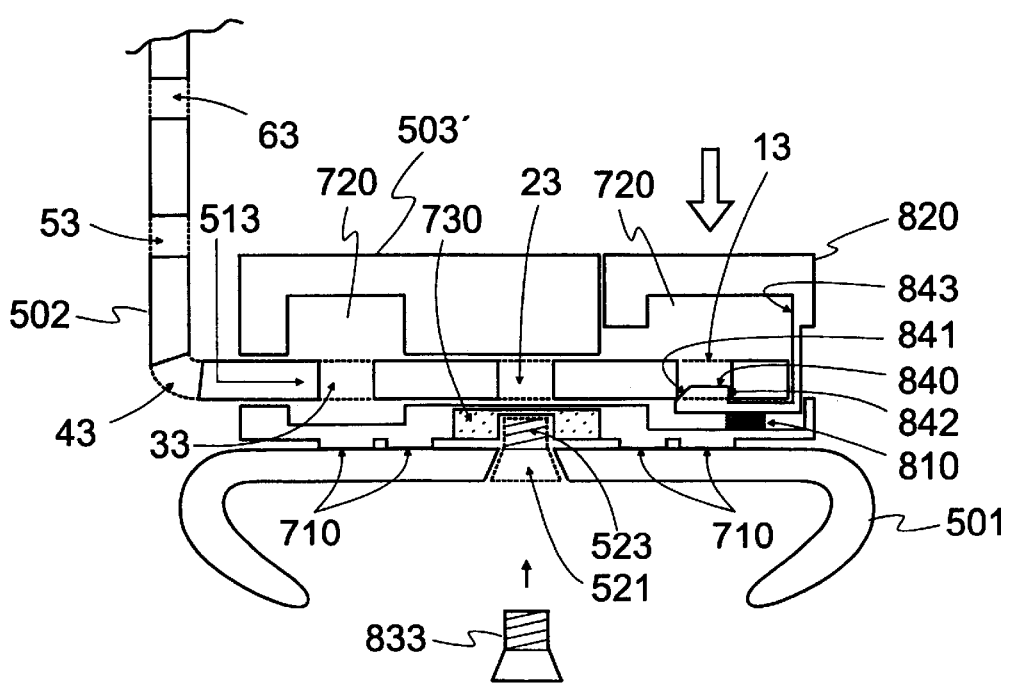
FIG. 9 is a sectional view illustrating an alternative embodiment of the invention.

FIG. 9 shows a situation in crosscut where the aperture plate 502 is in position in the recess 513 of the adapter part. The crosscut shown in FIG. 9 is taken at the same level, on which the adapter part 503' and the mobile phone holder 501 are cut in FIG. 8. FIG. 9 corresponds with the situation shown in FIG. 8, where the aperture plate 502 is inserted into the recess 513 of the adapter part, but in comparison to FIG. 8, FIG. 9 also includes a few more details. The adapter part 503' comprises a set of studs 710 on its outer surface that is suitable to be placed on the counterpart surface of the mobile phone holder 501 so that the mobile phone part 501 is pressed against the adapter part 503' with a screw 833, and the set of studs 710 locks the mobile phone holder 501 into an appropriate position in relation to the adapter part 503'.

The adapter part 503' can comprise hollow parts 720 for making the adapter part lighter. The hollow parts 720 may be connected to the recess 513 of the adapter part. The adapter part hole 523 is surrounded with an insert 730 made of metal and including a threaded hole. In fact the threaded hole in the insert 730 forms the hole 523 of the adapter part mentioned above. A dashed line illustrates the position of the screw 833 when the screw is tightened.

As shown above the aperture plate 502 is locked inside the adapter part 503' with a locking element 840. When the aperture plate 502 is inserted into the recess 513 inside the adapter part, the edge of the aperture plate 502 presses the locking element 840 (and the entire locking part 820) downwards from the bevel 841 as the aperture plate slides over the locking element 840. The locking element 840 is made such that it fits into the hole 13 of the aperture plate. When the hole 13 reaches the locking element 840, said locking element 840 moves inside the hole 13 by means of the spring force of the spring 810. A rear wall 843 of the locking part prevents the aperture plate 502 from moving further inside the adapter part 503' and the threshold 842 of the locking element prevents the aperture plate from moving outwards from the adapter part.

If the arrangement composed of the adapter part 503' and the mobile phone holder 501 is detached from the aperture plate 502, then the locking part 820 is pressed with a finger in the direction of the arrow (in the direction that is perpendicularly against the level formed by the portion of the aperture plate inside the adapter part 503'), in which case the spring 810 is pressed and the locking element moves away from the aperture plate hole 13, and the threshold 842 of the locking element is pressed below the aperture plate 502 level, thus releasing the aperture plate 502 to move away from the aperture part 503'. FIG. 9 shows the holes 13, 23, 33, 43, 53 and 63 in the middle of the aperture plate.

FIG. 10 is a perspective view illustrating an alternative embodiment of the adapter part 503'. Said adapter part 503' is similar to the one described in the preferred embodiment of the invention, except that in this case the adapter part 503' comprises a locking part 820 that moves in the vertical direction. In addition, the hole 523 of the adapter part 503' does not in this case extend as far as to the recess 513. The mouth of the hole 523 in the adapter part is at the bottom of the adapter part (on the opposite side of the adapter part than the locking part 820) and therefore not shown in FIG. 10.

Depending on the situation the aperture plate 502 can be bent into an appropriate shape in order to fasten the arrangement comprising the mobile phone holder 501, the adapter part 503, 503' and the aperture plate 502 to an object. FIG. 11 shows an example. The aperture plate 502 is bent into opposite directions at the fourth and fifth lines of holes, in which case a one-way transition is formed on the aperture part. The adapter part 503, 503' is fastened to the aperture plate 502, as shown above in this description. The mobile phone holder 501 is fastened to the adapter part 503, 503' so that the pocket 511 of the mobile phone holder, where the mobile phone is placed, points to an opposite direction than the mouth of the recess 513. The set of studs of the adapter part 503, 503' allows the mobile phone holder 501 to be fastened into an appropriate position, as shown above. The aperture plate 502 is inserted into a vertical groove 1110, whose mouth points upwards.

The aperture plate 502 is made of metal, plastic or of some other appropriate material. The adapter part 503, 503' is made of plastic. However, the insert 730, spring 810 and fastening screw 533, 833 of the adapter part are preferably made of an appropriate metal or alloy in order to provide a strong and reliable fastening with screws.

The aperture plate can be bent by hand along the lines 544, 545 formed by the holes. Other than 90-degree bends can also be used. For example, if the aperture plate is bent along the line 544, the bending line 544 moves perpendicularly towards the longitudinal axis of the aperture plate. Alternatively, the holes can be selected so that the line 545 formed thereby is not perpendicularly placed against the longitudinal axis of the aperture plate, in which case the aperture plate can be diagonally bent in relation to the longitudinal axis.

The preferred embodiment of the invention shows that the recess 513 of the adapter part has substantially the form of a rectangle. Thus the edges of the rectangular aperture plate 502 touch (or at least nearly touch) the recess edges when the aperture plate is in position in the recess, in which case the aperture plate cannot move (shake) significantly in relation to the adapter part 503. Alternatively the recess of the adapter part may be shaped differently, however, so that the recess edges include an adequate amount of supporting points in order to keep the aperture plate in position. The shape of the aperture plate may also vary.

In accordance with the alternative embodiment of the invention the adapter part 503' and the mobile phone holder 501 are fastened to one another with a screw. The arrangement composed of the adapter part and the mobile phone holder can rapidly be attached to the aperture plate 502 using quick release locking and detached from the aperture plate by pressing the locking part and by pulling the arrangement away from there. If an aperture plate 502 is mounted into an appropriate groove or gap, for example, in a car or in a boat, the combination/arrangement including the adapter part and the mobile phone holder can easily be attached to the car, when the person owing the mobile phone is in the car, and then shift the arrangement to a boat when the person concerned is in the boat.

In addition to fastening the mobile phone car holder, some of the applicable parts of the invention can be used for fastening various accessories of wireless terminals into appropriate grooves and gaps.

A further embodiment of the invention is also presented. This embodiment does not employ an adapter part, instead the recess (513) used in the adapter part is arranged into the mobile station holder (501). Now, the aperture plate (502), which is bent into an appropriate position along the aperture line 544, is inserted into the recess (513) of the mobile station holder and locked with a screw or a quick release lock similarly as shown above. FIG. 12 illustrates this embodiment. FIG. 12 is merely directive and not shown in a proper scale.

The implementation and embodiments of the invention are described in the specification by means of examples. However, it is obvious for those skilled in the art that the invention is not restricted to the details of the above examples and that the invention can be implemented in other ways without deviating from the characteristics of the invention. The presented embodiments are to be considered instructive, but not restricting. Therefore the possibilities to implement and employ the invention are only restricted by the appended claims. Therefore, the various alternatives to implement the invention defined in the claims, including equivalent implementations, are included in the scope of the invention.

What is claimed is:

1. A fastening arrangement comprising an accessory of a wireless communications device, an adapter part and a substantially plate shaped piece, the substantially plate shaped piece having holes in order to allow the substantially plate shaped piece to be bent at a line formed of the holes, and the substantially plate shaped piece being arranged to be fastened from a first point into a groove outside the arrangement, the fastening arrangement comprising fastening means for connecting the adapter part and said accessory with one another, wherein the adapter part has a general case shape and comprises a recess for receiving a second point of the substantially plate shaped piece inside the adapter part in order to fasten the adapter part and said accessory to the substantially plate shaped piece.

2. A fastening arrangement as claimed in claim 1, wherein said accessory of a wireless communications device is a mobile station holder arranged to receive a mobile station.

3. A fastening arrangement as claimed in claim 2, wherein a screw is arranged to penetrate the mobile station holder, at least partly the adapter part and the substantially plate shaped piece, when the substantially plate shaped piece is in the recess of the adapter part, and to connect the mobile station holder, the adapter part and the substantially plate shaped piece together so that said screw remains substantially totally hidden within the fastening arrangement.

4. A fastening arrangement as claimed in claim 1, wherein said accessory is a holder arranged to receive an earpiece of a phone.

5. A fastening arrangement as claimed in claim 1, wherein the arrangement is intended to be fastened to a vehicle without requiring holes to be made inside the vehicle.

6. A fastening arrangement as claimed in claim 1, wherein the arrangement is arranged to be fastened from the substantially plate shaped piece into the groove outside the fastening arrangement without having to make holes in order to fasten the fastening arrangement into the groove.

7. A fastening arrangement as claimed in claim 1, wherein the substantially plate shaped piece is arranged to be locked into the recess of the adapter part with a screw that is arranged to penetrate the substantially plate shaped piece and the recess of the adapter part.

8. A fastening arrangement as claimed in claim 1, wherein the substantially plate shaped piece is arranged to be locked to the recess of the adapter part using a quick release lock.

9. A fastening arrangement as claimed in claim 8, wherein the quick-release lock comprises a locking element arrangement to move into a particular hole in the substantially plate shaped piece, when moving the substantially plate shaped piece in the recess of the adapter part, thus preventing the substantially plate shaped piece from moving out from the recess.

10. A fastening apparatus for fastening an accessory of a wireless communications device to a fastening portion outside the fastening apparatus, the fastening apparatus comprising an adapter part and a substantially plate shaped piece, the substantially plate shaped piece having holes in order to allow said piece to be bent at a line formed of the holes, and the substantially plate shaped piece being arranged to be fastened from a first point into a groove outside the arrangement, the fastening arrangement comprising fastening means for connecting the adapter part and said accessory with one another, wherein the adapter part has a substantial case shape and comprises a recess for receiving a second point of the substantially plate shaped piece inside the adapter part in order to fasten the adapter part and said accessory to the substantially plate shaped piece.

11. A fastening arrangement comprising an accessory of a wireless communication device and a substantially plate shaped piece, the substantially plate shaped piece having holes in order to allow it to be bent at a line formed of the holes, and the substantially plate shaped piece being arranged to be connected from a first point into a groove outside the arrangement, wherein the accessory has a general case shape and comprises a recess for receiving a second point of the substantially plate shaped piece within the accessory in order to fasten the accessory to the substantially plate shaped piece.

* * * * *